United States Patent

Liebig et al.

[11] Patent Number: 5,906,178
[45] Date of Patent: May 25, 1999

[54] DEGREE OF SEPARATION OF STEAM IMPURITIES IN A STEAM/WATER SEPARATOR

[75] Inventors: Erhard Liebig, Ditzinger, Germany; Robert Svoboda, Wettingen, Switzerland

[73] Assignee: Asea Brown Boveri AG, Baden, Switzerland

[21] Appl. No.: 09/059,401

[22] Filed: Apr. 14, 1998

[30] Foreign Application Priority Data

May 26, 1997 [DE] Germany .............. 197 21 854

[51] Int. Cl.[6] .............. F16T 1/00; F22B 33/00
[52] U.S. Cl. .............. 122/451 S; 122/488; 122/1 B
[58] Field of Search .............. 122/1 B, 1 C, 122/7 R, 430, 451 S, 476, 477, 488

[56] References Cited

U.S. PATENT DOCUMENTS

| | | | |
|---|---|---|---|
| 4,261,298 | 4/1981 | McDonald et al. | 122/488 |
| 4,393,816 | 7/1983 | Bock | 122/1 C |
| 4,869,210 | 9/1989 | Wittchow | 122/451 S |
| 5,293,842 | 3/1994 | Loesel | 122/1 C |
| 5,765,509 | 6/1998 | Liebig et al. | 122/1 C |
| 5,776,413 | 7/1998 | Kamberger et al. | 122/488 |

FOREIGN PATENT DOCUMENTS

19544224A1 6/1997 Germany.

*Primary Examiner*—John A. Jeffery
*Assistant Examiner*—Gregory A. Wilson
*Attorney, Agent, or Firm*—Burns, Doane, Swecker & Mathis, L.L.P.

[57] ABSTRACT

In a once-through steam generator, a separating bottle (25) is inserted between the evaporator (22) and the superheater (23). To purify the water/steam circuit, a greater quantity of water than is necessary is conveyed through the evaporator (22) via a feed pump (20). The water quantity is measured in such a way that wet steam enters the separating bottle (25). This water fraction, together with all the impurities contained therein, is separated in said bottle and is drawn off via a blowdown line (29). On the occasion of overfeeding, a conditioning agent is metered to the water, in order to reduce the volatility of the substances to be separated.

6 Claims, 1 Drawing Sheet

DEGREE OF SEPARATION OF STEAM IMPURITIES IN A STEAM/WATER SEPARATOR

BACKGROUND OF THE INVENTION

Field of the Invention

The invention relates to a method for purifying the water/steam circuit in a once-through steam generator which consists essentially of an economizer, an evaporator and a superheater, a separating bottle being inserted between the evaporator and the superheater.

Discussion of Background

Once-through steam generators of this type may be used as waste heat boilers of composite plants. It is true that, at the present time, waste heat boilers for utilizing the waste heat from gas turbine plants are, as a rule, designed with drum boilers. The water/steam circuit is purified by upgrading in the respective drum and by continuous or discontinuous blowdown of the drum. Upgrading is carried out by evaporating the water in the boiler drum. Nonvolatile substances therefore remain in the boiler water and are increasingly upgraded. When the boiler water is blown down, the substances are consequently removed from the circuit in concentrated form and efficiently. Moreover, in many cases, a solid alkalizing agent, such as trisodium phosphate or sodium hydroxide, is added to the drum water in order to set the pH value in the boiler.

However, if the waste heat boilers are provided with a simple once-through boiler, this purification mechanism is dispensed with, since such a boiler cannot be blown down. The purification of the water/steam circuit is, in this case, carried out in a condensate purification plant, in which the condensate, before being introduced into the steam generator, is filtered and, if appropriate, additionally desalinated by means of ion exchangers.

By contrast, if the waste heat boilers are provided with a once-through boiler mentioned initially, impurities can be drawn off from the separating bottle in the same way as in the case of a drum boiler, if the separating bottle is operated under specific conditions.

However, both types of boiler present the problem of many undesirable substances, such as, for example, chlorides and sulfates, which are present in volatile form, in the example as HCl or as $H_2SO_4$. This also applies to conventional circuit conditioning with ammonia in the form of volatile ammonium chlorides or of ammonium sulfates. Such substances may lead to corrosion and consequently to operating faults and damage.

SUMMARY OF THE INVENTION

On the one hand, proceeding from the fact that, in the case of once-through boilers, metering with nonvolatile conditioning agents has hitherto strictly been dispensed with, since these agents would be deposited in the superheated boiler parts, on the other hand, proceeding from the knowledge that, in the case of drum boilers, as a result of the addition of alkalizing agents the volatility of said chlorides and sulfates is drastically reduced, so that these can effectively be blown down, for example during phosphate conditioning of the boiler water, one object of the invention, in a plant of the type initially mentioned which is to dispense with a condensate purification plant, is to provide a novel measure which reduces the volatility of the substances present and consequently makes it easier to separate these from the circuit.

This is achieved, according to the invention, in that, when the plant is in the full load mode, a greater quantity of water than is necessary is conveyed via a feed pump through the economizer and the evaporator, said water quantity being measured in such a way that wet steam enters the separating bottle, in that the water fraction of the steam, together with all the impurities contained therein, is separated in the separating bottle and is drawn off via a blowdown line, and in that, on the occasion of overfeeding, a conditioning agent is metered to the water, said agent reducing the volatility of the impurities to be removed.

According to an advantageous variant, the plant is first run down or run up to part load or operated under part load, before the once-through steam generator is overfed and a conditioning agent is metered to the water, said agent reducing the volatility of the impurities to be removed.

The advantages of the invention are to be seen, inter alia, in a consideration reduction of the plant and operating costs, in minimizing the risk as a result of the absence of a chemical plant in the water/steam circuit, in the improvement in the degree of separation and in the reduction of the purification time.

Expediently, a solid phosphate or a self-decomposing alkalizing agent, for example a higher-molecular organic amine, is metered as a conditioning agent.

It is particularly appropriate to employ the new method in the case of a combined gas/steam power station plant which has a gas turbine circuit and a steam turbine circuit, the waste gases from a gas turbine transferring their residual heat to a steam turbine via the working medium flowing in the once-through steam generator. This is because, despite the above statement that, in the case of once-through boilers, metering with conditioning agents has hitherto strictly been dispensed with, in waste heat boilers with a steam generator of this type some solid agents, such as, for example, sodium phosphate, may readily be used. In this case, some deposition in the superheated boiler part is deliberately allowed for. This is possible because conditions are uncritical as regards the heat transmission of the boiler. On the one hand, the additives are in only small quantities, for example 10 grams per hour. On the other hand, in the combined gas/steam power station, superheating is ruled out on account of the restricted hot gas temperature. It is merely necessary to ensure that a substance is used which is not corrosive even in the high concentration and/or in the dry state. These deposits in the superheater can be flushed out with saturated steam during the run down, in the event of a shutdown or during the next startup.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
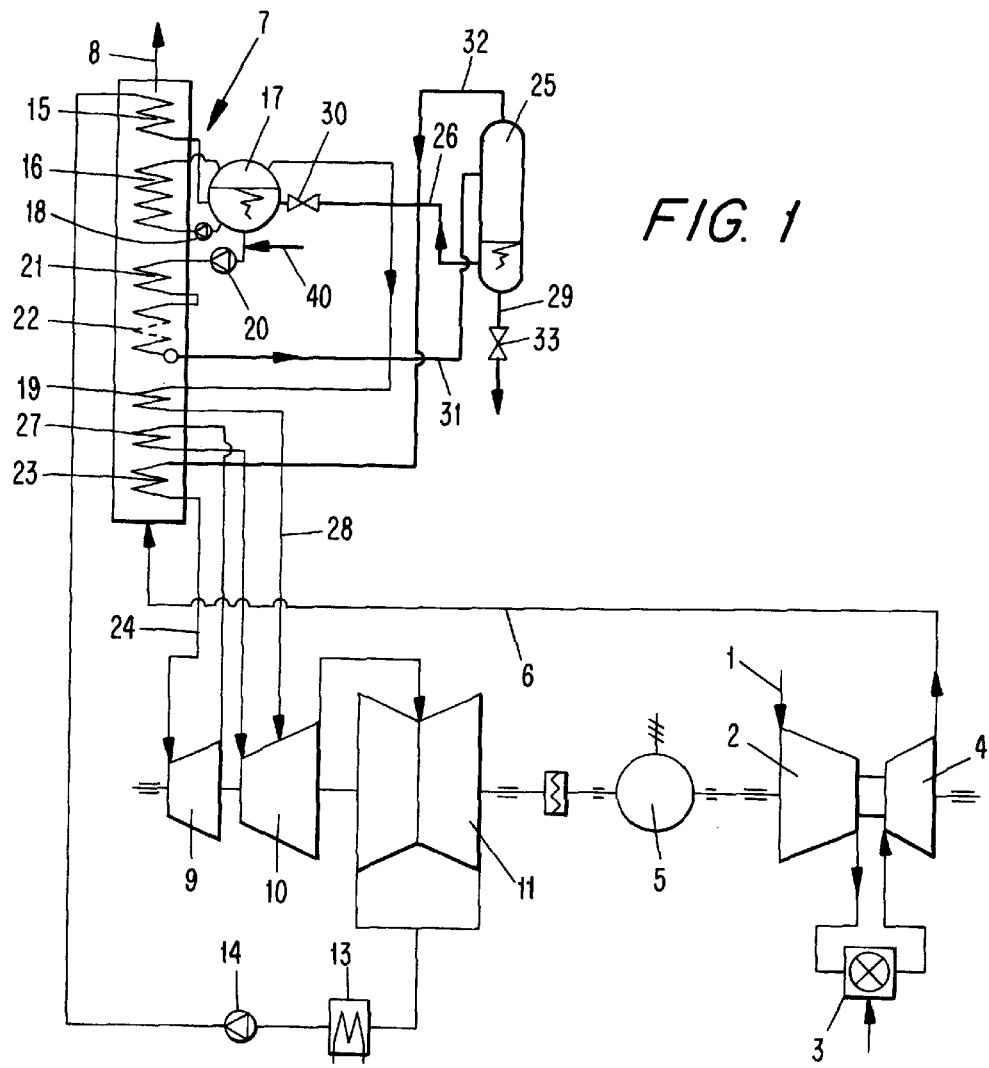
FIG. 1 shows a diagram of a combined gas/steam power station plant.

Referring now to the drawings, wherein like reference numerals designate identical or corresponding parts throughout the several views, in FIG. 1 fresh air sucked in via a line 1 is compressed to the working pressure in a compressor 2 in the gas turbine system. The compressed air is highly heated in a combustion chamber 3, for example fired by natural gas, and the fuel gas thus obtained is expanded in a gas turbine 4 so as to perform work. The energy gained at the same time is transferred to a generator 5 or the compressor 2. The still hot waste gas from the gas turbine is supplied from the outlet of the gas turbine, via a line 6, to a waste heat steam generator plant 7 and, after discharging its heat, is led from this into the open via a line 8 and a chimney (not illustrated).

In the water/steam circuit, a multicasing steam turbine 9, 10 and 11 is arranged on the same shaft as the gas turbine. The working steam expanded in the low pressure turbine 11 condenses in a condenser 13. The condensate is conveyed directly into the steam generator 7 by means of a condensate pump 14. It is notable that the plant has no steam-heated feedwater tank/deaerator.

The waste heat steam generation plant 7 is designed as a vertical boiler and, in the present case, works according to a dual pressure steam process. A horizontal boiler could, of course, also be employed. The number of pressure stages in the particular example is likewise unimportant.

The low pressure system is designed as a circulating system with a drum, a forced circulation system having been selected here. It consists, in the flue gas path of the boiler, of a low pressure economizer 15, into which the condensate is introduced, of a low pressure evaporator 16 and of a low pressure superheater 19. The low pressure evaporator is connected to a drum 17 via a circulating pump 18. The superheated steam is transferred into a suitable stage of the medium pressure steam turbine 10 via a low pressure steam line 28.

The high pressure system is designed as a once-through system and can therefore be rated both for subcritical and for supercritical parameters. It consists, in the flue gas path of the boiler, essentially of the high pressure economizer 21, of the high pressure evaporator 22 and of the high pressure superheater 23. The working medium is supplied to the high pressure economizer 21 from the low pressure drum 17 via a high pressure feed pump 20. The hitherto conventional feedwater tank may thereby be dispensed with. The superheated steam is transferred into the high pressure part 9 of the steam turbine via a fresh steam line 24.

For phase separation, a separating bottle 25 is provided, into which the outlet of the high pressure evaporator 22 opens via a line 31. The separating bottle is connected at its upper end to the high pressure superheater 23 via a line 32. At its lower end, the bottle is additionally provided with a blowdown line 29. A recirculation line 26 likewise extends from the lower end of the separating bottle, said recirculation line containing a shutoff member 30 and opening into the low pressure drum 17.

After partial expansion in the high pressure part 9 of the turbine, the steam is intermediately superheated before being transferred into the medium pressure turbine 10. In the particular example, this intermediate superheating takes place in heat exchange surfaces 27 which are arranged in the flue gas path of the steam generator above the high pressure superheater 23.

The separating bottle ensures that the high pressure superheater remains dry at all times and superheated steam is available at an early time at the boiler outlet. As soon as the pressure necessary for stable operation is reached in the high pressure evaporator, the fresh steam can be used for starting up the steam turbine in the sliding pressure mode.

According to a first feature of the invention, then, it is to be possible, fundamentally, to dispense with a condensate purification plant. This is based on the consideration that the impurities in the steam/water circuit can be drawn off in the region of the separating bottle.

The steam/water circuit can be purified both under full load and under part load. Under full load, the high pressure system is overfed, that is to say a greater quantity of water than is necessary is conveyed through the once-through steam generator via the high pressure feed pump. It goes without saying that, in the case of a single high pressure feed pump, this has to be designed so as to be correspondingly larger for the extra quantity. If the plant is provided with pump redundancy, for example in the form of 2×100% or 3×50%, the replacement pump can be employed for overfeeding.

The conveyed water quantity is set in such a way that wet steam in any event enters the bottle. The impurities are bound in the water droplets of the water/steam mixture. In the bottle, the water fraction of the steam is separated by suitable means and is drawn off via the blowdown line 29. An advantage of this method is that the circuit is largely free of impurities even after only a few passes, that is to say within a very short time.

In a variant, in which circuit purification can take place by means of the feed pump dimensioned for normal operation, the steam generator is operated under part load, for example 80%. Accordingly, as in the full load method, the high pressure system is overfed, and the procedure takes place in conformity with the method described above.

The separation efficiency depends on the distribution coefficient. This distribution coefficient is designed as the ratio of the concentration of the impurities in the steam phase and in the water phase at the inlet into the separating bottle. This ratio is closely dependent on the pressure, the dynamics of the evaporation process, that is to say the possibility of setting chemical equilibria, and on the impurities themselves. With a rising pressure, the numerical value of the distribution coefficient increases, that is to say the upgrading in the water decreases. The steam purity achievable at the outlet of the separation bottle is dependent on this distribution coefficient and on the blowdown rate. The lower the distribution coefficient and consequently the pressure at the separator, the higher the steam purity becomes, and vice versa.

According to a further feature of the invention, a measure is to be provided which reduces the volatility of the substances present and consequently makes it easier to separate them from the circuit. This is carried out by metering a conditioning agent and results in an advantageous reduction in the distribution coefficient. Since the above described purification of the water/steam circuit via the separating bottle 25 necessitates a special limited-time operating mode of the plant, the metering of chemicals is also carried out only during this purification period, during which the separating bottle is operated under wet conditions.

The chemicals are introduced into the feed line upstream of the feed pump 20 by suitable means at 40.

The actual metering, that is to say the chemical to be used and its quantity, is carried out, in this case, in dependence on the nature of the impurity and its degree. Metering takes place continuously during the entire purification process. The ammonia metering ($NH_3$) and oxygen metering ($O_2$ gas), which occur in normal operation, are set, during purification, by means of conditioning agents. However, this is not an absolute condition, but depends on the nature of the impurity and therefore of the conditioning agent to be used.

Solids, on the one hand, and self-decomposing alkalizing agents, on the other hand, may be added.

As regards the first mentioned group, in particular sodium phosphate can be used, whether it is in the form of pure trisodium phosphate or as a mixture of trisodium phosphate and disodium phosphate.

The second mentioned group would have to include, for example, higher-molecular organic amines. These products, since they have a condensability preferably directed into the water phase, would first reduce the volatility of the anionic impurities. They would therefore decompose at least partially in the boiler. In this case, however, it would be necessary to remember that the decomposition products themselves could constitute a disturbing impurity. In this case, after the purification process has ended, they would have to be destroyed by adding a further substance. For example, metering with oxygen gas would be suitable for this purpose.

Figure 2:
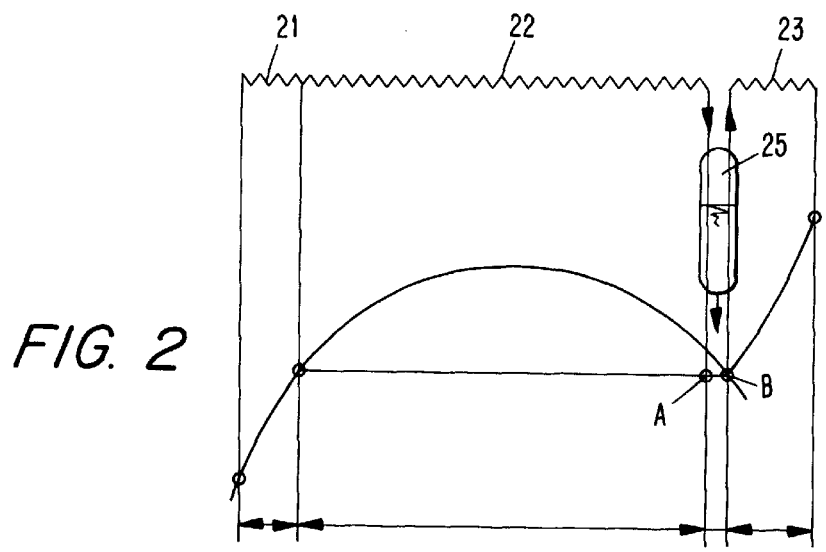
FIG. 2 shows a temperature/entropy graph.

FIG. 2 illustrates, in a temperature/entropy graph, the symbolic arrangement of the separating bottle 25 during the purification phase and during the metering of chemicals. In the wet steam phase, moisture and impurities are drawn off from the separating bottle between points A and B.

It emerges from all of this that, during normal operation, the separating bottle 25 is dry and no metering of chemicals in order to reduce the volatility of particular impurities takes place. By contrast, for purification under full load or under part load, wet steam must enter the bottle. According to the method described above, the necessary moisture enters the bottle due to the fact that the system is overfed, this being achieved by increasing the feedwater mass flow and/or by cutting back the gas turbine. The reduction in volatility by means of chemicals, carried out on the occasion of this purification process, improves the degree of separation, this being essential, in particular, with regard to the volatile substances. Moreover, the measure leads to a reduction of the purification process.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for purifying the water/steam circuit in a once-through steam generator which consists essentially of an economizer (21), an evaporator (22) and a superheater (23), a separating bottle (25) being inserted between the evaporator (22) and the superheater (23), wherein, in the full load mode of the plant, a greater quantity of water than is necessary is conveyed through the economizer (21) and the evaporator (22) via a feed pump (20), said water quantity being measured in such a way that wet steam enters the separating bottle (25), wherein the water fraction of the steam, together with all the impurities contained therein, is separated in the separating bottle and is drawn off via a blowdown line (29), and wherein, on the occasion of overfeeding, a conditioning agent is metered to the water, said agent reducing the volatility of the impurities to be removed.

2. A method for purifying the water/steam circuit in a once-through steam generator which consists essentially of an economizer (21), an evaporator (22) and a superheater (23), a separating bottle (25) being inserted between the evaporator (22) and the superheater (23), wherein, during the rundown or runup of the plant to part mode or in the part load mode, a greater quantity of water than is necessary is conveyed through the economizer (21) and the evaporator (22) via a feed pump (20), said water quantity being measured in such a way that wet steam enters the separating bottle (25), wherein the water fraction of the steam, together with all the impurities contained therein, is separated in the separating bottle and is drawn off via a blowdown line (29), and wherein, on the occasion of overfeeding, a conditioning agent is metered to the water, said agent reducing the volatility of the impurities to be removed.

3. The method as claimed in claim 1, wherein the conditioning agent is added to the water upstream of the feed pump (20).

4. The method as claimed in claim 1, wherein the conditioning agent is a solid phosphate.

5. The method as claimed in claim 1, wherein there is a self-decomposing alkalizing agent, for example a higher-molecular organic amine, as a conditioning agent.

6. A use of the method as claimed in claim 1 in a combined gas/steam power station plant which has a gas turbine circuit and a steam turbine circuit, the waste gases from a gas turbine (4) transferring their residual heat to a steam turbine via the working medium flowing in a once-through steam generator.

\* \* \* \* \*